United States Patent
Pelletier

(10) Patent No.: US 9,343,890 B2
(45) Date of Patent: May 17, 2016

(54) ELECTRICAL CABLE RESTRAIN DEVICE USING A DOUBLE WEDGE CHUCK

(71) Applicant: Thomas & Betts International, Inc., Wilmington, DE (US)

(72) Inventor: Jean-Michel Pelletier, Quebec (CA)

(73) Assignee: Thomas & Betts International LLC, Wilmington, DE (US)

( * ) Notice: Subject to any disclaimer, the term of this patent is extended or adjusted under 35 U.S.C. 154(b) by 140 days.

(21) Appl. No.: 14/151,994

(22) Filed: Jan. 10, 2014

(65) Prior Publication Data

US 2014/0202760 A1  Jul. 24, 2014

Related U.S. Application Data

(60) Provisional application No. 61/755,669, filed on Jan. 23, 2013.

(51) Int. Cl.
*H02G 3/18* (2006.01)
*H01R 13/58* (2006.01)
*F16L 17/00* (2006.01)
*H02G 15/007* (2006.01)
*H02G 3/06* (2006.01)
*H02G 15/04* (2006.01)

(52) U.S. Cl.
CPC ........... *H02G 15/007* (2013.01); *H02G 3/0658* (2013.01); *H02G 3/0675* (2013.01); *H02G 15/04* (2013.01); *Y10T 279/17358* (2015.01)

(58) Field of Classification Search
CPC ...... H01R 13/59; H01R 4/646; H01R 9/0527; H01R 13/187; H01R 13/6584; H02G 3/0641; H02G 3/065; H02G 3/0658; H02G 3/0666

USPC ...................... 174/653, 658, 652; 439/462, 98
See application file for complete search history.

(56) References Cited

U.S. PATENT DOCUMENTS

| | | | |
|---|---|---|---|
| 3,667,783 A * | 6/1972 | Sotolongo | H02G 3/0616 174/665 |
| 3,744,008 A | 7/1973 | Castellani | |
| 3,989,340 A | 11/1976 | Sheldon et al. | |

(Continued)

FOREIGN PATENT DOCUMENTS

| | | |
|---|---|---|
| CA | 933975 A1 | 9/1973 |
| CA | 1036323 A1 | 8/1978 |

(Continued)

*Primary Examiner* — Chau N Nguyen
*Assistant Examiner* — Roshn Varghese
(74) *Attorney, Agent, or Firm* — Snyder, Clark, Lesch & Chung, LLP

(57) ABSTRACT

A cable fitting includes a gland nut, a body, and a chuck. The gland nut includes first threads, an axial gland bore, and a first sloped surface along a portion of the axial gland bore. The body includes second threads to receive the first threads, an axial body bore, and a second sloped surface along a portion of the axial body bore. The chuck includes multiple segments joined in a hinged fashion to create a ring. Each of the multiple segments includes a distal end tapered surface and a proximal end tapered surface. When the gland nut is advanced onto the body, the first sloped surface applies a first compressive force to the distal end tapered surfaces, and the second sloped surface applies a second compressive force to the proximal end tapered surfaces. The compressive forces cause inward deformation of the chuck to secure a cable within an axial pathway.

20 Claims, 5 Drawing Sheets

(56) References Cited

U.S. PATENT DOCUMENTS

| | | |
|---|---|---|
| 4,030,741 A | 6/1977 | Fidrych |
| 4,070,085 A | 1/1978 | Nelson |
| 4,114,974 A | 9/1978 | Lawrence |
| 4,208,085 A | 6/1980 | Lawrence et al. |
| 4,250,348 A | 2/1981 | Kitagawa |
| 4,323,727 A | 4/1982 | Berg |
| 4,387,267 A * | 6/1983 | Becker .................. 174/655 |
| 4,686,738 A | 8/1987 | Bladh |
| 4,891,470 A * | 1/1990 | Studenski ............ F16L 5/06 174/653 |
| 5,059,747 A | 10/1991 | Bawa et al. |
| 5,211,576 A | 5/1993 | Tonkiss et al. |
| 5,246,376 A | 9/1993 | Schuhl et al. |
| 5,374,017 A | 12/1994 | Martin et al. |
| 5,621,191 A | 4/1997 | Norris et al. |
| 5,743,759 A | 4/1998 | Pudims et al. |
| 6,149,455 A | 11/2000 | Levi |
| 7,749,021 B2 | 7/2010 | Brodeur |
| 8,288,667 B2 | 10/2012 | Chiou |
| 2009/0025977 A1 | 1/2009 | Anderson et al. |
| 2012/0142207 A1 | 6/2012 | Duval et al. |

FOREIGN PATENT DOCUMENTS

| | | |
|---|---|---|
| CA | 1039377 A1 | 9/1978 |
| CA | 1040280 A1 | 10/1978 |
| CA | 1040281 A1 | 10/1978 |
| CA | 1115817 A1 | 1/1982 |
| CA | 1201877 A1 | 3/1986 |
| CA | 2266253 C | 9/1999 |
| CA | 2216279 C | 4/2005 |
| CA | 2446276 C | 3/2007 |
| CA | 2285397 C | 11/2007 |
| CA | 2665700 C | 11/2012 |
| DE | 20211347 | 10/2002 |
| DE | 20 2007 011 452 U1 | 1/2008 |
| EP | 0 156 956 | 10/1985 |
| EP | 1172596 A1 | 6/2001 |
| WO | 8602209 | 4/1986 |

* cited by examiner

ELECTRICAL CABLE RESTRAIN DEVICE USING A DOUBLE WEDGE CHUCK

CROSS-REFERENCE TO RELATED APPLICATION

This application claims priority under 35 U.S.C. §119, based on U.S. Provisional Patent Application No. 61/755,669 filed Jan. 23, 2013, the disclosure of which is hereby incorporated by reference herein.

BACKGROUND OF THE INVENTION

Electrical cable fittings may be used to connect a flexible cable to an enclosure and to provide strain relief. In some instances, the electrical fitting may include a chuck that is compressed against the cable to form a mechanical grip around the cable.

DETAILED DESCRIPTION OF THE PREFERRED EMBODIMENTS

The following detailed description refers to the accompanying drawings. The same reference numbers in different drawings may identify the same or similar elements.

Figure 1:
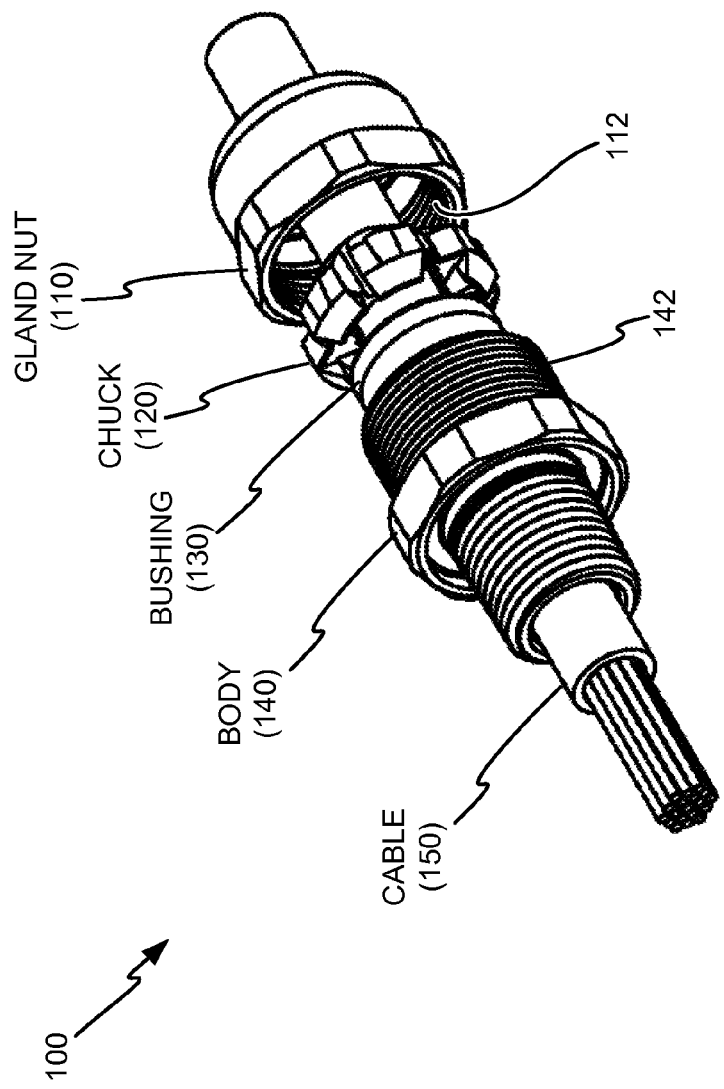
FIG. 1 is an isometric view of a cable restrain device in an unassembled configuration according to an implementation described herein.

In systems and methods described herein, a cable fitting with a dual wedge can provide increased cable retention force and reduced fitting length over single wedge fittings. FIG. 1 provides an isometric view of a cable restrain device 100 in an unassembled configuration according to an implementation described herein.

As shown in FIG. 1, cable restrain device 100 may include a gland nut 110, a chuck 120, a bushing 130, and a body 140. In a use case, body 140 may be axially aligned over a cable 150 and joined together to secure cable 150 within cable restrain device 100. More particularly, threads 112 of gland nut 110 may engage threads 142 of body 140 to enclose chuck 120 and bushing 130. Tightening threads 112 and 142 cause gland nut 110 to overlap body 140. As gland nut 110 and body 140 move closer together along a central axis of cable restrain device 100, angled surfaces on the interior of gland nut 110 and body 140 cause chuck 120 to collapse inwardly against cable 150 to retain cable 150.

Gland nut 110 and body 140 may be formed from, for example, aluminum, steel, or non-metallic materials to provide a rigid structure for securing cable 150. Chuck 120 may include a softer material, such as nylon, that may allow chuck 120 to collapse inwardly and compress against cable 150. Bushing 130 may include a sealing material, such as a thermoplastic rubber, that may allow bushing 130 to be inwardly compressed and guided by chuck 120.

Figure 2:
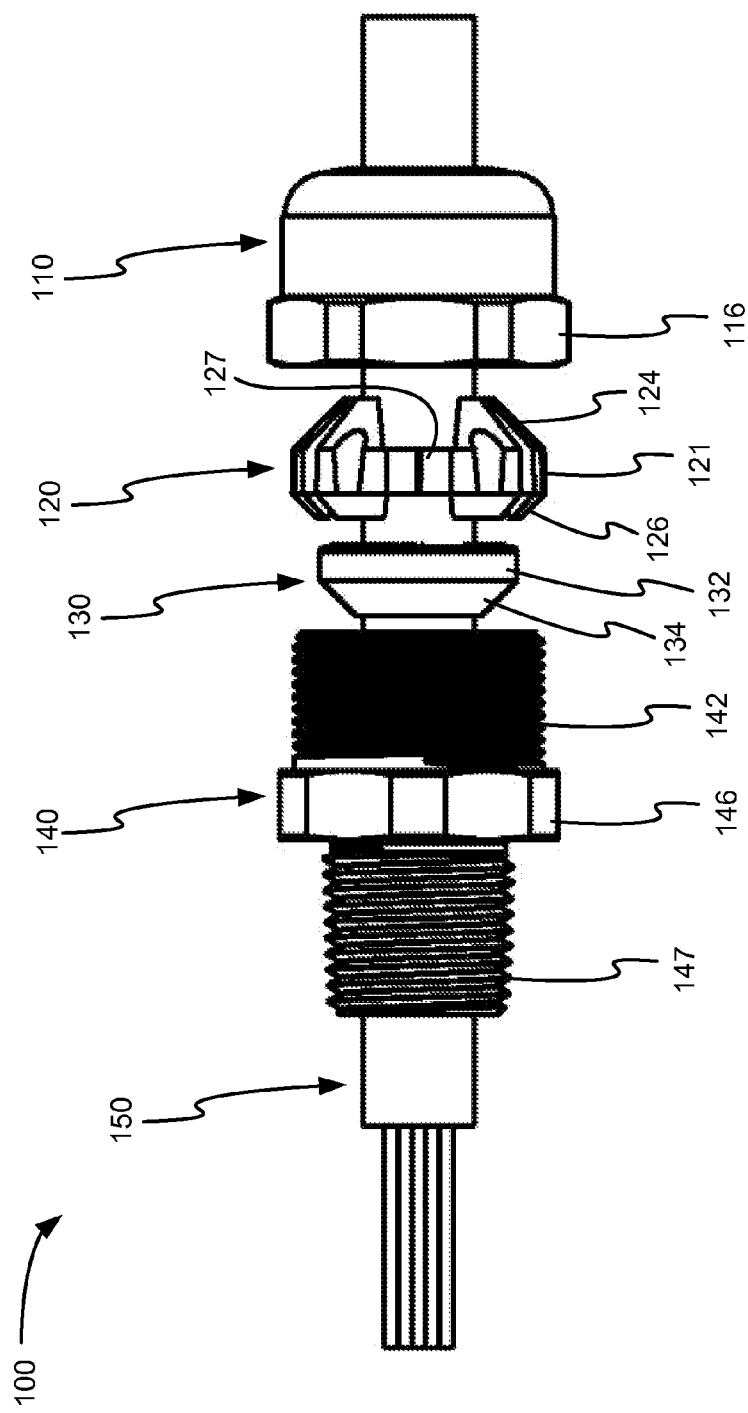
FIG. 2 is a side view of the cable restrain device of FIG. 1 in an unassembled configuration.
Figure 3:
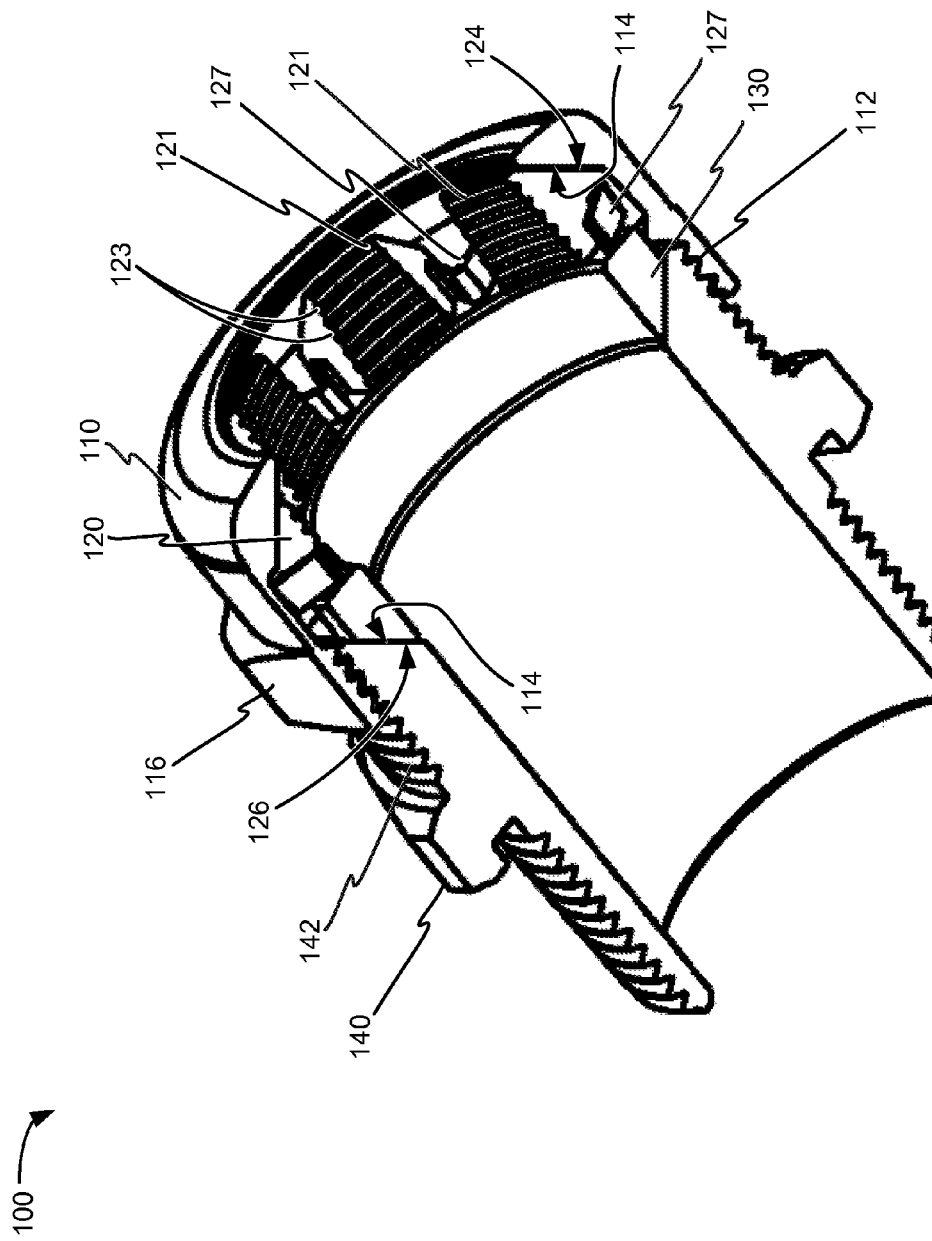
FIG. 3 is a cut-away perspective view of the cable restrain device of FIG. 1 in an assembled configuration.
Figure 4:
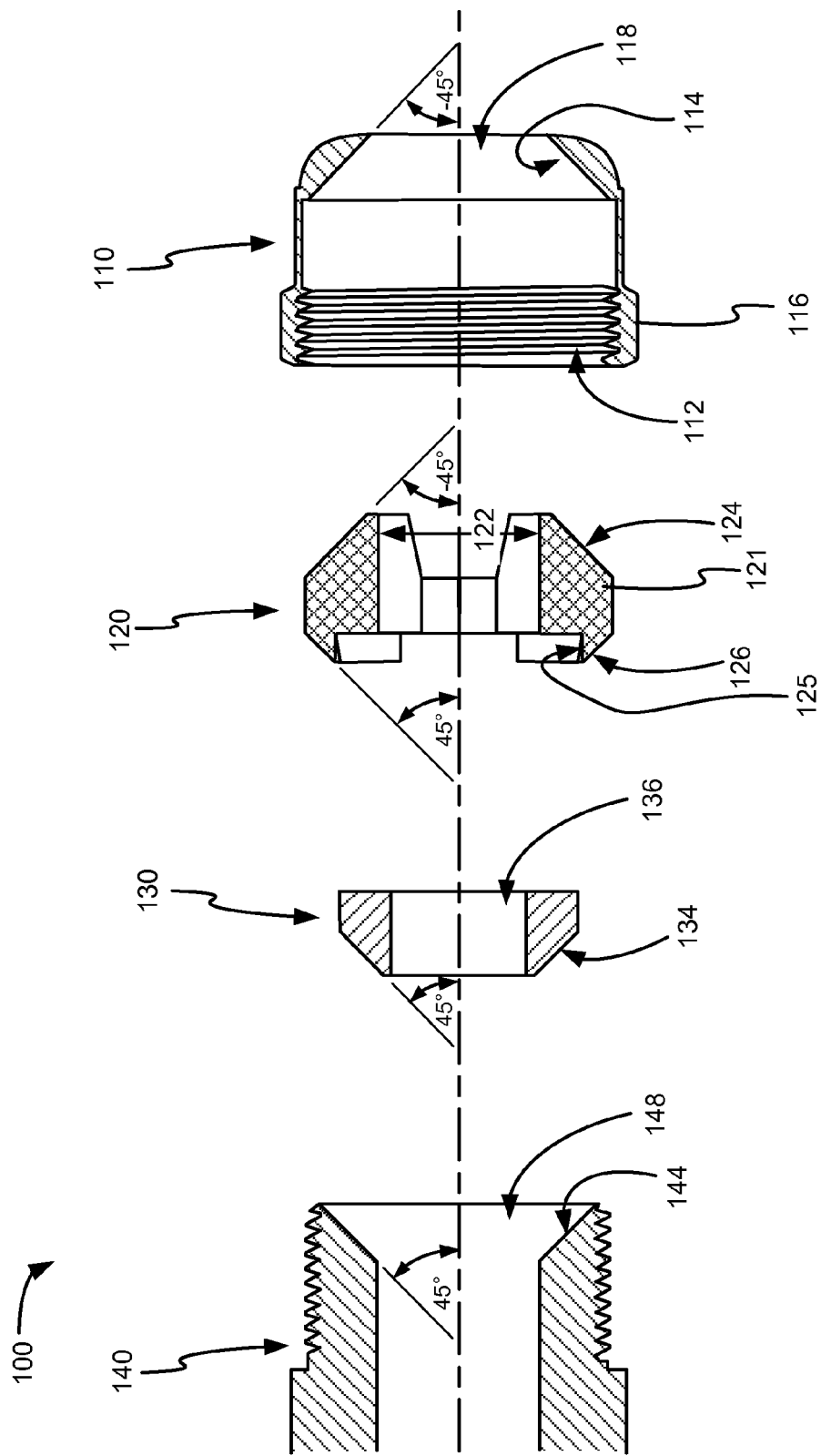
FIG. 4 is an exploded side cross-section view of the cable restrain device of FIG. 1.

FIG. 2 provides a side view of cable restrain device 100 in an unassembled configuration. FIG. 3 provides a cut-away perspective view of cable restrain device 100 in an assembled configuration. FIG. 4 provides an exploded side cross-section views of cable restrain device 100. Referring collectively to FIGS. 2-4, gland nut 110 may include interior threads 112, a sloped contact surface 114, a hexagonal band 116, and a bore 118.

Interior threads 112 may be configured to engage corresponding external threads 142 of body 140. Sloped contact surface 114 may extend annularly to form a portion of bore 118 of gland nut 110. Sloped contact surface 114 may generally have an angle from a central axis that provides a gradually decreasing inside diameter of a portion of bore 118 in a direction extending axially from a proximal end to a distal end of cable restrain device 100. For example, as shown in FIG. 4, sloped contact surface 114 may have an angle of −45 degrees that extends annularly about the central axis of cable restrain device 110. As described further herein, the angle of sloped contact surface 114 shown in FIG. 4 is illustrative, and other angles may be used (e.g., greater than or less than −45 degrees). The angle of sloped contact surface 114 may match a corresponding contact surface of chuck 120 (e.g., distal end tapered surface 124, described below) and may guide chuck 120 inwardly (e.g., toward a central axis of cable restrain device 100) as gland nut 110 is advanced axially onto body 140. Hexagonal band 116 may be provided on an outer surface of gland nut 110 to receive, for example, a wrench for tightening interior threads 112 of gland nut 110 onto threads 142 of body 140. Bore 118 may generally be configured to receive chuck 120 such that, when cable restrain device 100 is fully assembled, chuck 120 and bushing 130 may be contained within bore 118 of gland nut 110.

Figure 5B:
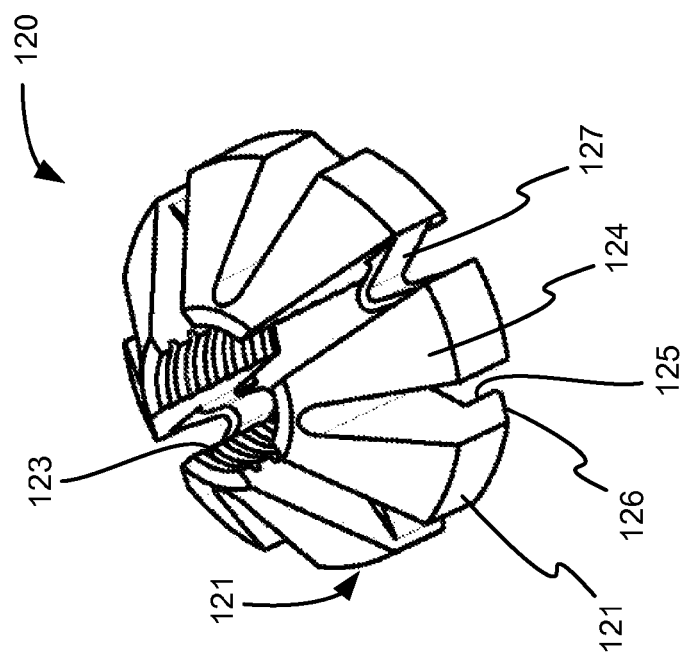
FIGS. 5A and 5B are a front view and side perspective view, respectively, of the chuck of the cable restrain device of FIG. 1.
Figure 5A:
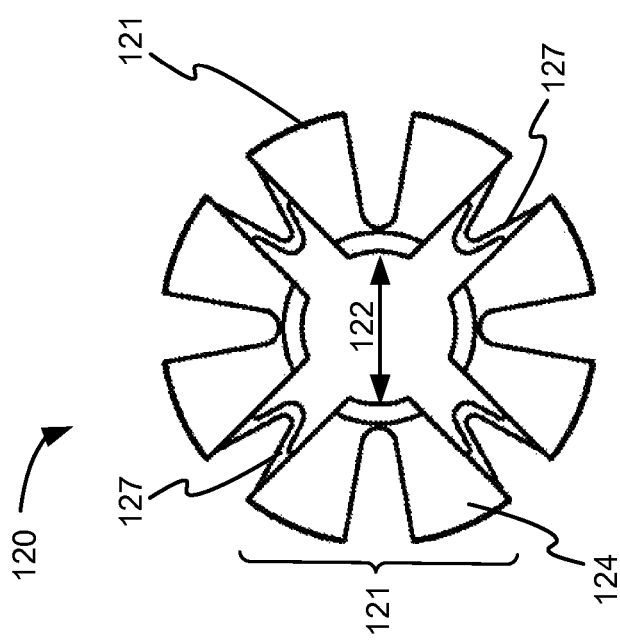

Additional views of chuck 120 are included in FIGS. 5A and 5B. Particularly, FIG. 5A provides a front view (e.g., looking onto the distal end) of chuck 120, and FIG. 5B provides a side perspective view of chuck 120. Referring collectively to FIGS. 2-5B, chuck 120 may include multiple segments 121 joined in a hinged fashion to form a ring with an inside diameter 122 sized to fit around cable 150 (not illustrated in FIG. 5A). Each segment 121 of chuck 120 may include interior teeth 123, a distal end tapered surface 124, a shoulder 125, and a proximal end tapered surface 126. Segments 121 may be connected via joints 127, such that chuck 120 may have a variable inside diameter 122.

As shown in FIG. 3, chuck 120 may be secured within gland nut 110 (e.g., within bore 118, FIG. 4). Distal end tapered surface 124 and proximal end tapered surface 126 of each segment 121 may be configured to interface with sloped contact surface 114 of gland 110 and a sloped contact surface 144 (described further below) of body 140.

Distal end tapered surface 124 and proximal end tapered surface 126 may generally have opposing angles that force segments 121 inwardly (e.g., toward a central axis of cable restrain device 100) as compressive axial pressure is applied to chuck 120. The angle of distal end tapered surface 124 may generally match an angle of corresponding sloped contact surface 114 of gland nut 110. The angle of proximal end tapered surface 126 may generally match an angle of corresponding sloped contact surface of body 140 described below.

Shoulder 125 of each segment 121 may form a seat for bushing 130. As described further below, bushing 130 may rest within a portion of chuck 120 in a circumference defined by shoulders 125. Shoulders 125 may position a central bore of bushing 130 in the axial pathway for cable 150.

Each distal end tapered surface 124 and each proximal end tapered surface 126 may slide each segment 121 toward a central axis of cable restrain device 100 as gland nut 110 is advanced on body 140. In one implementation, joints 127 may collapse inwardly (e.g., toward a central axis of cable restrain device 100) to permit inward movement of segments 121. In one implementation, joints 127 may include relatively thinner sections (e.g., compared to segments 121) with angled strips molded to fold inwardly. In another implementation, joints 127 may include scores lines or indentations essentially parallel to the axis of cable restrain device 100. Joints 127 may bend along the scored lines to allow segments 121 to collapse inwardly toward a central axis. Interior teeth 123 of each segment 121 may engage cable 150 to secure cable 150 within cable restrain device 100. Also, as joints 127 collapse inwardly, shoulder 125 of each segment 121 may force bushing 130 inward to seal around cable 150.

Referring to FIGS. 2-4, bushing 130 may include a generally ring-shaped object including a seating area 132 to engage chuck 120, a tapered surface 134 to engage body 140, and a central bore 136. The uncompressed diameter of bushing 130 at seating area 132 may generally be slightly smaller than an inside diameter of chuck 120 at shoulders 125 (e.g., before compression occurs). Tapered surface 134 may generally be configured to match the angle of proximal end tapered surface 126 and a sloped contact surface 144 of body 140 (described below). Tapered surface 134 may contact body 140 along sloped contact surface 144 when threads 112 of gland nut 110 are advanced onto threads 142 of body 140. Central bore 136 may generally be sized to accommodate cable 150 (or a particular range of sizes for cable 150). When inserted within chuck 120, central bore 136 may be axially aligned with a central axis of cable restrain device 100. Bushing 130 may be compressed (e.g., by shoulders 125 and sloped contact surface 144) to seal around cable 150 and sloped contact surface 144.

Body 140 may include external threads 142, sloped contact surface 144, a hexagonal band 146, installation threads 147, and a bore 148. External threads 142 may be configured to engage corresponding interior threads 112 of gland nut 110. Sloped contact surface 144 may extend annularly within body 140. Sloped contact surface 144 may generally have an angle from a central axis that provides a gradually increasing inside diameter of a portion of bore 148 in a direction extending axially from a proximal end to a distal end of cable restrain device 100. For example, as shown in FIG. 4, sloped contact surface 144 may have an angle of 45 degrees that extends annularly about the central axis of cable restrain device 110. As described further herein, the angle of sloped contact surface 144 shown in FIG. 4 is illustrative, and other angles may be used (e.g., greater than or less than 45 degrees). Sloped contact surface 144 may be wide enough to simultaneously contact surfaces on both chuck 120 and bushing 130 as chuck 120 and bushing 130 are compressed against body 140 by the threaded engagement of gland nut 110 with body 140.

The angle of sloped contact surface 144 may essentially match the angle of corresponding proximal end tapered surface 126 (of chuck 120) and tapered surface 134 (of bushing 130). Similar to sloped contact surface 114 of gland nut 110, sloped contact surface 144 of body 140 may guide chuck 120 inwardly as gland nut 110 is advanced axially onto body 140. Thus, chuck 120 may receive inwardly compressive forces on opposite ends from body 140 and gland nut 110, respectively.

Hexagonal band 146 may be provided on an outer surface of body 140 and may be configured to receive, for example, a wrench. Installation threads 147 of body 140 may be inserted through, for example, a wall of an enclosure or another support structure to which body 140 may be secured. In one implementation, a nut (not shown) may be applied over installation threads 147 with the wall in between to secure body 140 to the support structure. Bore 148 may generally be of a fixed diameter configured to receive cable 150 therethrough.

The taper angles of particular contact surfaces in cable restrain device 100 (e.g., sloped contact surface 114, distal end tapered surface 124, proximal end tapered surface 126, tapered surface 134, and sloped contact surface 144) may generally be shallower than conventional fittings that use a chuck and bushing compression system. The shallower taper angles may contribute to a reduction in the overall axial length of the cable restrain device 100. For example, as shown in FIG. 4, sloped contact surface 114 and distal end tapered surface 124 may have a one-to-one ratio of axial length to radial thickness (e.g., shown in FIG. 4 as an angle of −45 degrees). Similarly, proximal end tapered surface 126, tapered surface 134, and sloped contact surface 144 may have a one-to-one ratio of axial length to radial thickness (e.g., shown in FIG. 4 as an angle of 45 degrees).

In other implementations, different angles/ratios than those shown in FIG. 4 may be used. For example, any slope angles greater than ±25 degrees up to ±45 degrees or more may generally provide for a reduction in overall length, with predictable alignment, of cable restrain device 100 over conventional fittings. In another example, the proximal side angles (e.g., for proximal end tapered surface 126, tapered surface 134, and sloped contact surface 144) may be steeper or shallower than the distal side angles (e.g., for sloped contact surface 114, distal end tapered surface 124). Thus, in contrast with the illustration of FIG. 4, the angles of all sloped surfaces on the proximal side may not have the same absolute degree (e.g. ±value) as sloped surfaces on the distal side.

In contrast with the implementations described herein, conventional fittings that use a single wedge chuck may have relatively long gland nuts at the distal end that expensive to manufacture and require a larger amount of metal to form. Also, the length of these conventional fittings can make them difficult to mount in tight spaces. However, simply decreasing the length of the fitting would result in a larger taper angle on its internal parts which can compromise the self-guiding property of the bushing-chuck stack. For example, if the taper angle exceeds 25 degrees and a length/thickness ratio is less than 1, the alignment behavior of the bushing-chuck stack is generally unpredictable.

Thus, according to an implementation described herein, a cable fitting may include a gland nut, a body, and a chuck. The gland nut may include first threads, an axial gland bore, and a first sloped surface along a portion of the axial gland bore. The body may include second threads configured to receive the first threads, an axial body bore, and a second sloped surface along a portion of the axial body bore. The chuck may include multiple segments joined in a hinged fashion to create a ring. Each of the multiple segments may include a distal end tapered surface and a proximal end tapered surface. The gland nut, the body, and the chuck may be configured to form an axial pathway for receiving a cable. When the first threads of the gland nut are advanced onto the second threads of the body, the first sloped surface is configured to apply a first compressive force to the distal end tapered surfaces, and the second sloped surface is configured to apply a second compressive force to the proximal end tapered surfaces. The compressive forces cause inward deformation of the chuck to secure the cable within the axial pathway.

In another implementation, the cable fitting may further include a bushing with a central bore. Each of the multiple segments of the chuck may include a seating area to support the bushing within a circumference of the chuck and a shoulder to position the central bore in the axial pathway. When the first threads of the gland nut are advanced onto the second threads of the body, the shoulders may compress the bushing to seal around the cable.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A cable fitting, comprising:
   a gland nut including first threads, an axial gland bore, and a first sloped surface along a portion of the axial gland bore;
   a body including second threads configured to receive the first threads, an axial body bore, and a second sloped surface along a portion of the axial body bore; and
   a chuck including multiple segments and multiple joints interposed between the multiple segments, the multiple segments and multiple joints joined to create a ring, wherein each of the multiple segments includes a distal end tapered surface and a proximal end tapered surface, a taper angle of each of the proximal end tapered surfaces being greater than 25 degrees and less than or equal to 45 degrees from a central axis of the cable fitting,
   wherein each joint of the multiple joints includes a strip that folds inwardly along a line parallel to the central axis to reduce an inside diameter of the ring,
   wherein the gland nut, the body, and the chuck are configured to form an axial pathway for receiving a cable,
   wherein, the second sloped surface includes a same taper angle as the taper angle of each of the proximal end tapered surfaces such that, when the first threads of the gland nut are advanced onto the second threads of the body, the first sloped surface is configured to apply a first compressive force to the distal end tapered surfaces and the second sloped surface is configured to apply a second compressive force to the proximal end tapered surfaces, and
   wherein the first and second compressive forces cause inward deformation of the chuck to secure the cable within the axial pathway while maintaining the taper angle of each of the proximal end tapered surfaces.

2. The cable fitting of claim 1, further comprising:
   a bushing with a central bore,
   wherein each of the multiple segments of the chuck include a seating area to support the bushing within a circumference of the chuck and a shoulder to position the central bore in the axial pathway, and
   wherein, when the first threads of the gland nut are advanced onto the second threads of the body, the shoulders compress the bushing around the cable.

3. The cable fitting of claim 2, wherein the gland nut and the bushing are configured to fit within the axial gland bore.

4. The cable fitting of claim 2, wherein the bushing further comprises a tapered bushing surface and wherein the second sloped surface is configured to contact the tapered bushing surface.

5. The cable fitting of claim 2, wherein the bushing comprises a thermoplastic rubber material.

6. The cable fitting of claim 1, wherein a taper angle of one of the distal end tapered surfaces is greater than 25 degrees and less than or equal to 45 degrees from the central axis of the cable fitting.

7. The cable fitting of claim 6, wherein the proximal end tapered surface includes a same taper angle as the taper angle of each of the distal end tapered surfaces.

8. The cable fitting of claim 1, wherein the taper angle of the proximal end tapered surfaces and a taper angle of the distal end tapered surfaces are of a same angular degree.

9. The cable fitting of claim 1, wherein each of the multiple segments comprises a nylon material with teeth along an inwardly-facing surface.

10. The cable fitting of claim 1, wherein the second threads are located at a distal end of the body and wherein the body is further configured with installation threads at a proximal end of the body to secure the body to a mounting structure.

11. A chuck for a cable fitting, comprising:
    multiple segments positioned around a central axis, each segment including:
      a first tapered surface on a distal end, wherein the first tapered surface slopes outwardly from the distal end away from the central axis at an angle greater than 25 degrees and less than or equal to 45 degrees from the central axis, and
      a second tapered surface on a proximal end, wherein the second tapered surface slopes outwardly from the proximal end away from the central axis at an angle greater than 25 degrees and less than or equal to 45 degrees from the central axis; and
    multiple joints interposed between the multiple segments, wherein the multiple segments and multiple joints form a ring configured to receive a cable,
    wherein each segment of the multiple segments is configured to receive compressive forces on the first tapered surface and the second tapered surface to force each segment of the multiple segments inwardly toward the central axis, and
    wherein each joint of the multiple joints includes a strip that folds inwardly along a line parallel to the central axis to reduce an inside diameter of the ring.

12. The chuck of claim 11, wherein each segment of the multiple segments further includes teeth along an inwardly-facing surface to engage the cable.

13. The chuck of claim 11, wherein the slope of the first tapered surface and the slope of the second tapered surface are each ±45 degrees from the central axis.

14. The chuck of claim 11, wherein the slope of the first tapered surface is 45 degrees from the central axis.

15. The chuck of claim 11, wherein the slope of the first tapered surface and the slope of the second tapered surface have different length-to-thickness ratios.

16. The chuck of claim 11, wherein each segment of the multiple segments further comprises:
a seating area to support a bushing, and
a shoulder to compress the bushing when the segment is forced inwardly toward the central axis.

17. The chuck of claim 11, wherein the chuck is configured to fit within an axial bore of a gland nut that includes a sloped internal surface that matches the angle of the first tapered surface.

18. A cable fitting, comprising:
a gland nut including a first axial bore, wherein the gland nut includes internal threads along a portion of the first axial bore and a first sloped surface along another portion of the first axial bore;
a body including external threads configured to receive the internal threads and a second axial bore at a distal end, wherein the body includes a second sloped surface along the second axial bore;
a chuck, interposed between the gland nut and the body, wherein the chuck includes multiple segments and multiple joint sections interposed between each segment of the multiple segments, and wherein each segment of the multiple segments includes:
a distal end tapered surface that matches the first sloped surface at an angle greater than 25 degrees and less than or equal to 45 degrees from a central axis of the cable fitting,
a proximal end tapered surface that matches the second sloped surface at an angle greater than 25 degrees and less than or equal to 45 degrees from the central axis of the cable fitting,
a seating surface with a shoulder, and
an inward-facing surface,
wherein each of the joint sections includes a strip that folds inwardly along a line parallel to the central axis to reduce an inside diameter of the chuck; and
a bushing, configured to seat on the seating surface, the bushing including a third axial bore and a bushing tapered surface that matches the second sloped surface;
wherein the first axial bore, the second axial bore, the third axial bore, and the chuck are configured to form an axial pathway for a cable.

19. The cable fitting of claim 18, wherein, when the internal threads are advanced onto the external threads, the first sloped surface is configured to apply a first force to the distal end tapered surfaces, and the second sloped surface is configured to apply a second force to both the proximal end tapered surfaces and the bushing tapered surface,
wherein the first and second forces cause inward deformation of the chuck to force the inward-facing surfaces against the cable, and
wherein, the shoulders force the third axial bore of the bushing against the cable.

20. The cable fitting of claim 18, wherein each of the distal end tapered surfaces includes a same taper angle as the taper angle of each of the proximal end tapered surfaces.

* * * * *